Dec. 28, 1948.  A. LETVIN  2,457,478
SERVICE COUPLING
Filed May 14, 1946
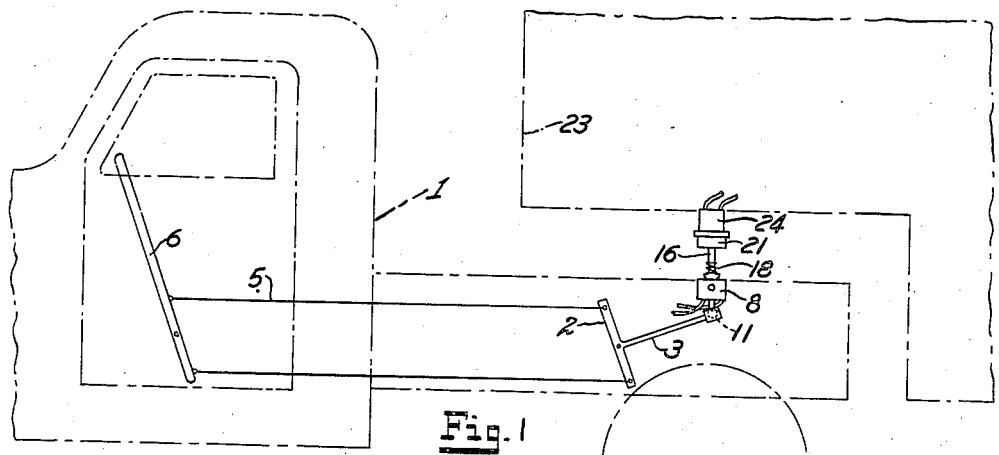
Fig. 1
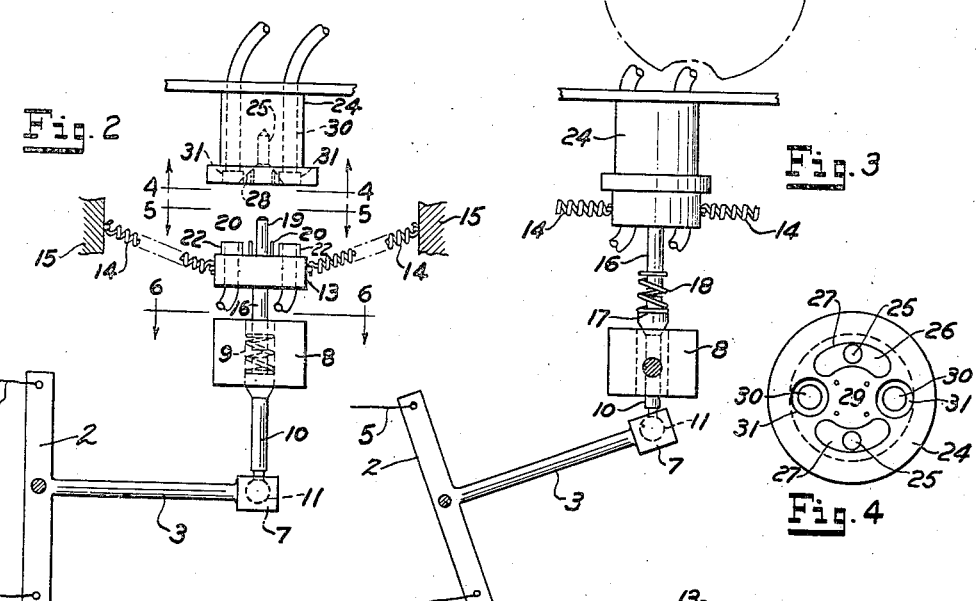
Fig. 2  Fig. 3  Fig. 4
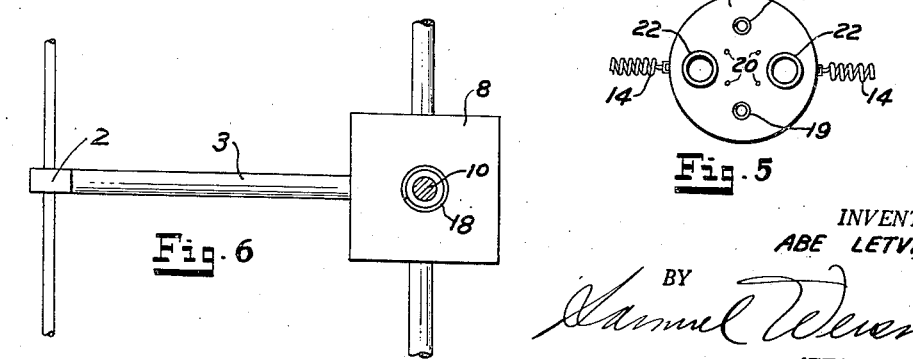
Fig. 5
Fig. 6
INVENTOR.
ABE LETVIN.
BY
ATTORNEY.

Patented Dec. 28, 1948

2,457,478

UNITED STATES PATENT OFFICE 2,457,478

SERVICE COUPLING

Abe Letvin, Detroit, Mich., assignor of one-half to Harry Moore, Detroit, Mich.

Application May 14, 1946, Serial No. 669,704

7 Claims. (Cl. 280—33.05)

1

The present invention pertains to a novel service coupling for vehicles and adapted particularly for a tractor-trailer combination.

The service lines of the coupled vehicles are ordinarily made by hand at the point of coupling. This operation requires the driver to leave his seat and often to stand on muddy ground or work under other unfavorable conditions such as exposure to inclement weather. Again, the hand made connections may occasionally not be secure, resulting in unsafe conditions.

The principal object of this invention is to overcome the aforementioned objections and is accomplished essentially by a mechanical device operated from a suitable location on the driver-occupied vehicle and adapted to make the several connections simultaneously for the required services. In the accomplishment of this object, the vehicle that carries the operating mechanism also carries a floatingly supported coupling block designed to engage with a complementary receiving block on the other vehicle. The coupling block is guided for sliding movement by means of a stem extending into a suitable guide member. The latter also receives another stem which is actuated by the aforementioned control or operating member on the same vehicle. The free ends of the two stems, when received in the guide member, are surrounded by a coil spring.

The actuation of the operating mechanism inserts the second named stem farther into the guide member and ejects the other stem therefrom, leaving the two stems connected at their free ends only by the coil spring. The coupling block is also floatingly supported externally of the guide member. The spring connecting the stems permit the coupling block to take a free or universal movement in alining itself and registering with the receiving block.

For the alinement of the two blocks, the receiving block has at least one cavity adapted to receive a pilot pin on the coupling block. The mouth of the cavity is in the nature of a tapered recess having an outwardly diverging wall. By this means the pilot pin is guided to the cavity until entering the same.

The two blocks are provided with supply connections which register and communicate with one another when the blocks have been fully coupled together. The aforementioned spring connection between the two stems now being disposed outside of the guide member, still constitutes a free or universal joint which, together with the floating support of the coupling block,

2 takes up whatever play occurs between the coupled vehicles.

The invention is fully disclosed by way of example in the following description and in the accompanying drawings in which:

Figure 1 is a side elevation of the device;

Figure 2 is a similar elevation on a larger scale;

Figure 3 is a similar elevation of the device in a different position, and

Figures 4, 5 and 6 are elevations on the lines 4—4, 5—5 and 6—6 of Figure 2.

Reference to these views will now be made by use of like characters which are employed to designate corresponding parts throughout.

In Figure 1 is shown a portion of a tractor designated generally by the numeral 1. At a suitable location on the tractor, preferably near the coupling, is pivotally mounted a rocker arm 2 with a horizontal arm 3 extending from its midpoint. The ends of the rocker 2 are connected by cables 5 to a lever 6 suitably mounted in the cab of the tractor. The free end of the arm 3 is formed with a socket 7 for a purpose that will presently be described.

The tractor is provided with a fixed guide block 8 having a vertical passage 9 therethrough. An operating stem 10 has its upper end slidably received in the lower end of the passage 9 and its lower end formed with a ball 11 received in the socket 7 of the arm 3. It is now evident that pulling on the upper cable 5 by the lever 6 causes the stem 10 to move upward.

A coupling block 13 is held in alinement, when uncoupled, by a pair of springs 14 extending from the block to a pair of fixed members designated by the numeral 15. A stem 16 extends downward from the block 13 and loosely into the passage 9. The stem 10 is formed with a shoulder 17 disposed in the cavity or passage 9, and on this shoulder is secured a coil spring 18 which receives the lower end of the stem 16 and is also secured to the stem. The parts are in this position when the device is uncoupled, and the spring 18 comes into operation on coupling in the manner presently to be described.

The upper surface of the block 13 carries a pair of pilot pins 19, and between these are a number of electrical contact pins 20. The block 13 is also formed with a pair of passages 21 therethrough parallel to the axis and extending from top to bottom. Bosses 22 are mounted on the upper surfaces of the block 13 in alinement with the passages 21 respectively.

The trailer frame 23 carries a receiving block 24 adapted to become alined approximately with the coupling block 13 when the tractor is backed up under the trailer. The block 24 is formed with a cavity 26 having a pair of spaced arcuate edges 27 concentric about the center of the block and having a tapering inner wall 28 that converges toward the cavity. When the coupling block 13 is moved upward, the walls 28 guide the pins 19 to their respective cavities 25. The lower face of the block 24 is formed with electrical sockets 29 adapted to receive the pins 20 when alinement has been made by reception of the pilot pins 19 in the cavities 25.

The block 24 is also formed with a pair of fluid passages 30 from end to end and aligned respectively with the passages 21 and block 13. The lower ends of the passages 30 are enlarged at 31 to receive the bosses 22 as pilots.

In order to make the coupling, the stem 10 is raised in the manner already described. On this movement the shouldered portion 17 rides out of the block 8, and the coil spring 18 is compressed against the bottom of the coupling block 13, as shown in Figure 3. The spring 18 thus constitutes a floating support between the stems 9 and 16 and there is a floating action at the ball 11 permitting the block 13 to take whatever movement is necessary in alining itself with the block 24.

Fluid supply lines, such as air hoses, are connected to the lower ends of the passages 21 and supply fluid through the passages 30 to corresponding appliances on the trailer. In like fashion an electrical path is established to the sockets 29 and to the electrical appliances connected thereto.

Although a specific embodiment of the invention has been illustrated and described, it will be understood that various alterations in the details of construction may be made without departing from the scope of the invention as indicated by the appended claims.

What I claim is:

1. A coupling comprising a guide member, a stem slidable in one end thereof, a coupling block adjacent to the opposite end of said guide member, a stem extending from said block into said guide member, a spring enclosing the free ends of said stems, means for sliding the first named stem and ejecting the second named stem and said spring from said guide member, and a receiving block engageable by said coupling block on said sliding of the first named stem.

2. A coupling comprising a guide member, a stem slidable in one end thereof, a coupling block adjacent to the opposite end of said guide member, a stem extending from said block into said guide member, a spring enclosing the free ends of said stems, means for sliding the first named stem and ejecting the second named stem and said spring from said guide member, means floatingly supporting said coupling block, and a receiving block engageable by said coupling block on said sliding of the first named stem.

3. A coupling comprising a coupling block, supply connections thereon, a pilot pin thereon, a receiving block adjacent to the coupling block and having a cavity adapted to receive said pin, said receiving block having a recess at the open end of said cavity, said recess having a tapering wall converging toward said cavity, complementary supply connections on said receiving block adapted to register with the first named connections, means floatingly supporting said coupling block, and means for moving said coupling block toward said receiving block.

4. A coupling comprising a guide member, a stem slidable in one end thereof, a coupling block adjacent to the opposite end of said guide member, a stem extending from said block into said guide member, a spring enclosing the free ends of said stems, means for sliding the first named stem and ejecting the second named stem from said guide member, supply connections on said coupling block, a pilot pin thereon, a receiving block adjacent to the coupling block and having a cavity adapted to receive said pin, said receiving block having a recess at the open end of said cavity, said recess having a tapering wall converging toward said cavity, and complementary supply connections on said receiving block adapted to register with the first named connections.

5. A coupling comprising a guide member, a stem slidable in one end thereof, a coupling block adjacent to the opposite end of said guide member, a stem extending from said block into said guide member, a spring enclosing the free ends of said stems, means for sliding the first named stem and ejecting the second named stem from said guide member, supply connections on said coupling block, a pilot pin thereon, a receiving block adjacent to the coupling block and having a cavity adapted to receive said pin, said receiving block having a recess at the open end of said cavity, said recess having a tapering wall converging toward said cavity, complementary supply connections on said receiving block adapted to register with the first named connections, and means floatingly supporting said coupling block.

6. A coupling comprising a coupling block, supply connections thereon, a pair of pilot pins thereon, a receiving block adjacent to said coupling block and having a pair of cavities adapted to receive said pins, said receiving block having a recess at the open end of each cavity, each recess having a substantial arcuate extent on the face of the block and having a tapering wall converging toward the corresponding cavity, complementary supply connections on said receiving block adapted to register with the first named connections on reception of said pins in said cavities, and means for moving one of said blocks toward the other block.

7. A coupling comprising a coupling block, supply connections thereon, a pair of pilot pins thereon, a receiving block adjacent to said coupling block and having a pair of cavities adapted to receive said pins, said receiving block having a recess at the open end of each cavity, each recess having a substantial arcuate extent on the face of the block and having a tapering wall converging toward the corresponding cavity, complementary supply connections on said receiving block adapted to register with the first named connections on reception of said pins in said cavities, means floatingly supporting said coupling block, and means moving said coupling block toward said receiving block.

ABE LETVIN.

REFERENCES CITED

The following references are of record in the file of this patent:

UNITED STATES PATENTS

| Number | Name | Date |
| --- | --- | --- |
| 1,874,918 | Davis | Aug. 30, 1932 |
| 1,973,610 | Connors | Sept. 11, 1934 |
| 2,062,806 | Casler | Dec. 1, 1936 |